United States Patent
Kramer et al.

(10) Patent No.: US 7,215,675 B2
(45) Date of Patent: May 8, 2007

(54) PROCESSOR WITH SOFTWARE-CONTROLLED PROGRAMMABLE SERVICE LEVELS

(75) Inventors: David B. Kramer, Austin, TX (US); David P. Sonnier, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 1022 days.

(21) Appl. No.: 10/085,771

(22) Filed: Feb. 28, 2002

(65) Prior Publication Data

US 2003/0161318 A1   Aug. 28, 2003

(51) Int. Cl.
*H04L 12/28* (2006.01)
*H04L 12/56* (2006.01)

(52) U.S. Cl. .................................. 370/395.4
(58) Field of Classification Search ............... 370/230, 370/389–396, 229, 263, 331, 236, 412, 463, 370/466, 352, 241, 429, 330, 311, 342, 411, 370/416, 252, 328, 469, 350, 235; 709/227, 709/232, 224, 228, 231; 707/102; 348/465, 348/460; 455/560–563, 67.13
See application file for complete search history.

(56) References Cited

U.S. PATENT DOCUMENTS

| | | | |
|---|---|---|---|
| 5,140,419 A * | 8/1992 | Galumbeck et al. ......... 348/465 |
| 5,455,948 A * | 10/1995 | Poole et al. ................. 707/102 |
| 5,694,554 A | 12/1997 | Kawabata et al. |
| 5,712,851 A | 1/1998 | Nguyen et al. |
| 5,889,763 A | 3/1999 | Boland et al. |
| 6,011,775 A * | 1/2000 | Bonomi et al. ............. 370/230 |
| 6,011,798 A | 1/2000 | McAlpine |
| 6,069,878 A * | 5/2000 | Christensen ................. 370/263 |
| 6,072,784 A * | 6/2000 | Agrawal et al. ............. 370/311 |
| 6,374,405 B1 | 4/2002 | Willard |
| 6,377,583 B1 | 4/2002 | Lyles et al. |
| 6,389,019 B1 | 5/2002 | Fan et al. |
| 6,414,963 B1 | 7/2002 | Gemar |
| 6,477,144 B1 | 11/2002 | Morris et al. |
| 6,483,839 B1 | 11/2002 | Gemar et al. |
| 6,526,062 B1 * | 2/2003 | Milliken et al. ........ 370/395.42 |
| 6,535,512 B1 * | 3/2003 | Daniel et al. ............ 370/395.1 |
| 6,603,766 B1 | 8/2003 | Zifroni et al. |
| 6,661,774 B1 * | 12/2003 | Lauffenburger et al. . 370/230.1 |
| 6,667,977 B1 | 12/2003 | Ono |
| 6,721,325 B1 | 4/2004 | Duckering et al. |
| 6,735,207 B1 * | 5/2004 | Prasad et al. ............. 370/395.7 |
| 2002/0080721 A1 * | 6/2002 | Tobagi et al. ................ 370/236 |
| 2002/0122403 A1 * | 9/2002 | Hashem et al. ............. 370/342 |
| 2002/0142780 A1 | 10/2002 | Airy et al. |

(Continued)

*Primary Examiner*—Chi Pham
*Assistant Examiner*—Prenell Jones (57) ABSTRACT

A processor includes scheduling circuitry and a priority computation element associated with the scheduling circuitry. The scheduling circuitry schedules data blocks for transmission from a plurality of transmission elements, in accordance with a transmission priority established by the priority computation element. The priority computation element, which may be implemented as a script processor, is operative to determine a transmission priority for one or more constituent transmission elements in a specified group of such transmission elements. The group of transmission elements corresponds to a first level of an n-level hierarchy of transmission elements, with the constituent transmission elements corresponding to at least one lower level of the n-level hierarchy of transmission elements. The transmission priority is preferably made adjustable under software control so as to facilitate the maintenance of a desired service level for one or more of the transmission elements.

20 Claims, 6 Drawing Sheets

U.S. PATENT DOCUMENTS

| | | |
|---|---|---|
| 2002/0159411 A1* | 10/2002 | Airy et al. .................. 370/330 |
| 2003/0021228 A1* | 1/2003 | Nakano et al. ............. 370/229 |
| 2003/0046414 A1 | 3/2003 | Pettyjohn et al. |
| 2003/0081624 A1 | 5/2003 | Aggarwal et al. |
| 2005/0050543 A1 | 3/2005 | Ogus et al. |

* cited by examiner

| QUEUE | PRIORITY |
|---|---|
| 1 | 1 |
| 2 | 2 |
| 3 | 3 |
| 4 | 4 |
| 5 | 5 |
| 6 | 6 |
| 7 | 7 |
| 8 | 8 |

FIG. 7B

| QUEUE | PRIORITY |
|---|---|
| 1 | 6 |
| 2 | 7 |
| 3 | 8 |
| 4 | 1 |
| 5 | 2 |
| 6 | 3 |
| 7 | 4 |
| 8 | 5 |

FIG. 8

PROCESSOR WITH SOFTWARE-CONTROLLED PROGRAMMABLE SERVICE LEVELS

RELATED APPLICATIONS

The present invention is related to the inventions described in U.S. patent application Ser. No. 10/085,219 entitled "Processor With Dynamic Table-Based Scheduling Using Linked Transmission Elements For Handling Transmission Request Collisions," U.S. patent application Ser. No. 10/085,223 entitled "Processor With Dynamic Table-Based Scheduling Using Multi-Entry Table Locations For Handling Transmission Request Collisions," and U.S. patent application Ser. No. 10/085,222 entitled "Processor With Table-Based Scheduling and Software-Controlled Interval Computation," all filed concurrently herewith and hereby incorporated by reference herein.

FIELD OF THE INVENTION

The present invention relates generally to techniques for transmitting packets or other blocks of data through a network, and more particularly to a network processor or other type of processor configured for use in performing operations such as routing or switching of such data blocks.

BACKGROUND OF THE INVENTION

A network processor generally controls the flow of data between a physical transmission medium, such as a physical layer portion of, e.g., an asynchronous transfer mode (ATM) network or synchronous optical network (SONET), and a switch fabric in a router or other type of packet switch. Such routers and switches generally include multiple network processors, e.g., arranged in the form of an array of line or port cards with one or more of the processors associated with each of the cards.

An important function of a network processor involves the scheduling of packets or other data blocks for transmission, e.g., for transmission to the switch fabric from the network or vice versa. A network processor typically includes a scheduler for implementing this function. One way that such a scheduler may be implemented involves the use of demand-based time slot tables, also referred to as dynamic time slot tables. In these cases, a significant problem that can arise relates to the manner in which the scheduler deals with transmission request collisions, that is, simultaneous requests for transmission in the same time slot. Typically, only a single block of data can be transmitted in a given time slot. When multiple data blocks request transmission in the same time slot, only one of the blocks can be transmitted, and the other blocks must be delayed or dropped. It should be noted that this problem is specific to demand-based time slot tables, and is generally not an issue for static time slot tables which can be configured to avoid collisions altogether.

The above-noted problem with demand-based time slot tables makes it difficult to maintain a desired traffic shaping for the transmitted data blocks in the corresponding network processor. This in turn complicates the provision of desired service levels, e.g., specified quality of service (QoS) or class of service (CoS) levels, for particular network connections supported by the network processor.

Another problem with conventional network processors is that such processors fail to provide acceptable implementations of programmable service level. For example, such processors generally use fixed, custom logic design to implement a particular CoS scheduling algorithm. Although attempts have been make to make this approach more flexible by allowing configurable weights for different classes of service, the particular algorithm remains fixed and therefore not reconfigurable under software control. As a result, these conventional processors are generally suitable for use only in the specific applications that require the particular CoS scheduling algorithm for which the processors were designed.

A need therefore exists for improved scheduling techniques for use in a network processor, so as to facilitate the provision of QoS, CoS or other desired service levels for corresponding network connections.

SUMMARY OF THE INVENTION

The invention provides improved techniques for scheduling data blocks for transmission in a network processor or other type of processor.

In accordance with one aspect of the invention, a processor includes scheduling circuitry and a priority computation element associated with the scheduling circuitry. The scheduling circuitry schedules data blocks for transmission from a plurality of transmission elements, in accordance with a transmission priority established by the priority computation element. The priority computation element, which may be implemented as a script processor, is operative to determine a transmission priority for one or more constituent transmission elements in a specified group of such transmission elements. The group of transmission elements corresponds to a first level of an n-level hierarchy of transmission elements, with the constituent transmission elements corresponding to at least one lower level of the n-level hierarchy of transmission elements. The transmission priority is preferably made adjustable under software control so as to facilitate the maintenance of a desired service level for one or more of the transmission elements.

In accordance with another aspect of the invention, the priority computation element determines an initial transmission priority for the constituent transmission elements of the group by designating a given one of the constituent transmission elements as a current high priority transmission element, with the other constituent transmission elements in the group being arranged in a linear order of decreasing priority relative to the current high priority transmission element. The priority computation element subsequently adjusts the transmission priority for the constituent transmission elements of the group by designating another of the constituent transmission elements as the current high priority transmission element, with the remaining constituent transmission elements in the group again being arranged in a linear order of decreasing priority relative to the current high priority transmission element.

Advantageously, the techniques of the invention provide a network processor with the ability to provide programmable service levels, thereby substantially improving processor flexibility, and facilitating the provision of QoS or CoS for network connections. Another advantage of the programmable service level techniques of the invention is that they can be configured to operate "out of band," i.e., the priority computations associated with provision of the programmable service levels may be performed after the transmission or scheduling for transmission of a given data block, so as not to delay the transmission of that data block.

DETAILED DESCRIPTION OF THE INVENTION

The invention will be illustrated herein in conjunction with an exemplary system for processing data for transmission through a network. The exemplary system includes a network processor configured in a particular manner in order to illustrate the techniques of the invention. It should be understood, however, that the invention is more generally applicable to any processor in which it is desirable to provide improved scheduling through the use of software-controlled programmable service levels.

A "processor" as the term is used herein may be implemented, by way of example and without limitation, utilizing elements such as those commonly associated with a microprocessor, central processing unit (CPU), digital signal processor (DSP), application-specific integrated circuit (ASIC), or other type of data processing device, as well as portions and combinations of such elements.

The present invention in an illustrative embodiment improves scheduling operations in a network processor or other processor through the use of a table-based scheduling technique in conjunction with software-controlled programmable service levels. Advantageously, the invention facilitates the provision of a desired service level for one or more transmission elements of the network processor.

Although illustrated herein in conjunction with dynamic table-based scheduling, the invention does not require the use of table-based scheduling, and can be implemented using other types of scheduling.

It should be noted that the programmable service level techniques of the present invention may be used in conjunction with the collision handling and interval computation techniques described in the above-cited U.S. Patent Applications filed concurrently herewith. For example, a given priority computation element as described herein may operate in conjunction with an interval computation element as described in the above-cited U.S. patent applications, and both such elements may be implemented using the same script processor, or separate script processors, within a given network processor.

Figure 1:
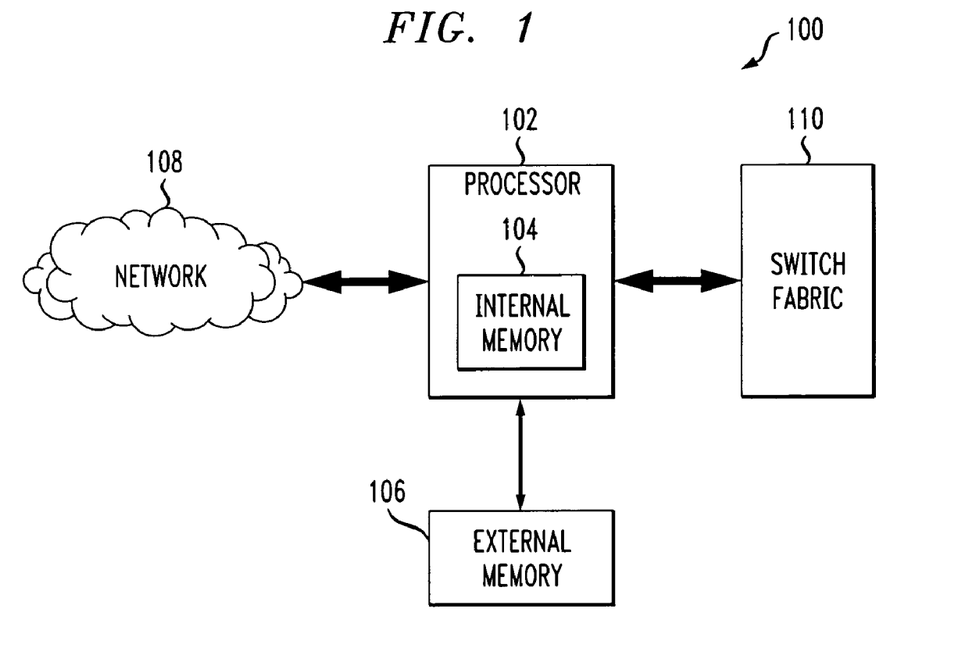
FIG. 1 is a simplified block diagram of an illustrative embodiment of a processing system in which the present invention is implemented.

FIG. 1 shows a network processing system 100 in which the invention is implemented. The system 100 includes a network processor 102 having an internal memory 104. The network processor 102 is coupled to an external memory 106 as shown, and is configured to provide an interface for communicating cells, packets, protocol data units (PDUs) or other arrangements of data between a network 108 and a switch fabric 110. All such arrangements of data are intended to be encompassed by the general term "data block" as used herein. The processor 102 and its associated external memory 106 may be implemented, e.g., as one or more integrated circuits installed on a line card or port card of a router or switch. In such a configuration, the switch fabric 110 is generally considered to be a part of the router or switch.

Figure 2:
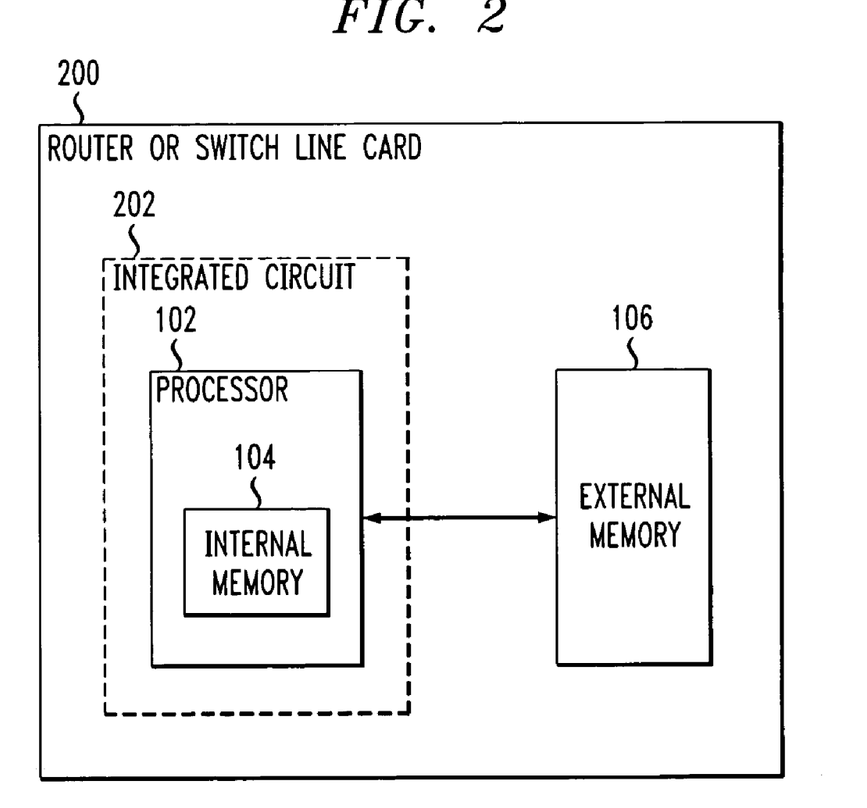
FIG. 2 illustrates one possible implementation of a network processor of the FIG. 1 system as an integrated circuit installed on a line card of a router or switch.

FIG. 2 illustrates an example router or switch line card embodiment of a portion of the system 100 of FIG. 1. In this embodiment, the processing system comprises a line card 200 having at least one integrated circuit 202 installed thereon. The integrated circuit 202 comprises network processor 102 which has internal memory 104. The network processor 102 interacts with external memory 106 on the line card 200. The external memory 106 may serve, e.g., as an external static random access memory (SRAM) or dynamic random access memory (DRAM) for the network processor integrated circuit 202. Such memories may be configured in a conventional manner. A suitable host processor may also be installed on the line card 200, and used for programming and otherwise controlling the operation of one or more network processor integrated circuits on the line card 200.

The portion of the processing system as shown in FIGS. 1 and 2 is considerably simplified for clarity of illustration. It is to be appreciated, however, that the processing system may comprise a router or switch which includes multiple line cards such as that shown in FIG. 2, and that each of the line cards may include multiple integrated circuits. A similar embodiment may be implemented in the form of a port card.

It should also be understood that the particular arrangements of system elements shown in FIGS. 1 and 2 are by way of illustrative example only. More specifically, as previously noted, the invention can be implemented in any type of processor, and is not limited to any particular network-based processing application.

Figure 3:
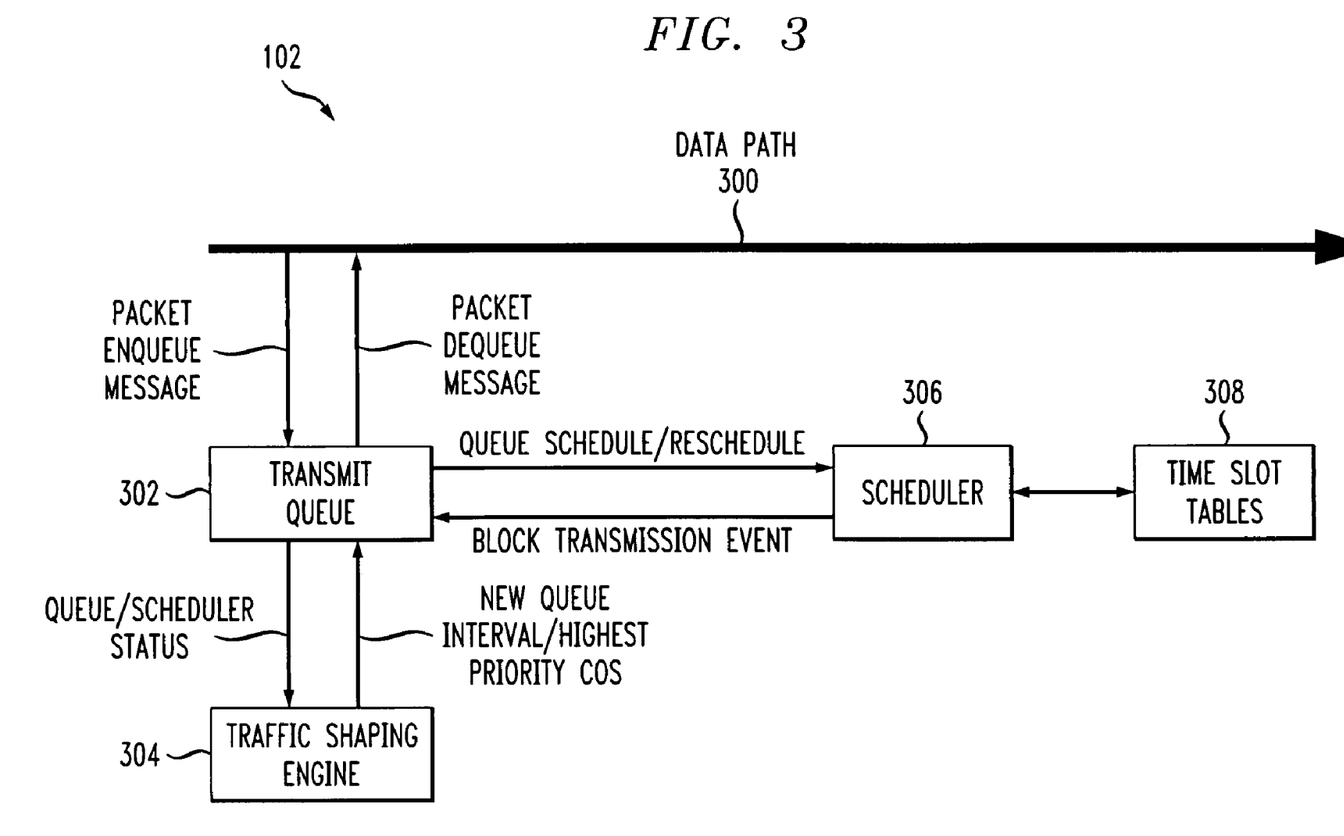
FIG. 3 is a more detailed view of a network processor of the FIG. 1 system configured in accordance with the techniques of the invention.

FIG. 3 shows a more detailed view of the network processor 102 in the illustrative embodiment of the invention. The network processor 102 in this embodiment includes a data path 300, a transmit queue 302, a traffic shaping engine 304, a scheduler 306, and a set of time slot tables 308.

The data path 300 may represent one or more processing elements which collectively provide a path for data blocks in passing through the processor 102. Such data path elements may be configured in a conventional manner well understood by those skilled in the art, and are therefore not described in further detail herein.

The transmit queue 302 preferably has a plurality of transmission elements associated therewith. For example, the transmit queue 302 may comprise a plurality of transmission queues and associated control logic, with each of the transmission queues corresponding to a transmission element. It should be noted, however, that the term "transmission element" as used herein is intended to be construed more generally so as to encompass any source of one or more data blocks that are to be scheduled for transmission in the network processor 102.

The transmit queue 302 in this embodiment is coupled to the traffic shaping engine 304 and to the scheduler 306, and provides an interface between these elements and the data path 300. In general, the transmit queue 302 supplies time slot requests from transmission elements associated therewith to the scheduler 306 in accordance with one or more traffic shaping requirements established by the traffic shaping engine 304 for the transmission of the data blocks from the transmission elements of the transmit queue 302.

Packets or other data blocks can be enqueued in transmission elements of the transmit queue 302 from the data path 300, e.g., in conjunction with packet enqueue messages and associated data blocks received from the data path 300. Similarly, packets or other data blocks can be dequeued from the transmission elements to the data path 300 upon transmission, e.g., in conjunction with packet dequeue messages and associated data blocks sent to the data path 300.

The traffic shaping engine 304 is coupled to the scheduler 306 via the transmit queue 302, and establishes the traffic shaping requirements in the illustrative embodiment. As is shown in the figure, the traffic shaping engine 304 receives information regarding queue and scheduler status from the transmit queue 302, and generates traffic shaping information that is returned to the transmit queue 302. This information may include information such as queue transmission interval and prioritization for establishing a class of service (CoS) or other desired service level for one or more of the transmission elements or their corresponding network connections. The term "traffic shaping requirement" as used herein is intended to include without limitation information that at least partially specifies a service level for one or more of the transmission elements or their corresponding network connections, e.g., a desired transmission rate, transmission interval, transmission order or prioritization for one or more of the transmission elements. The traffic shaping engine 304 is an example of an element referred to more generally herein as "traffic shaping circuitry." In other embodiments, traffic shaping circuitry may be configured to include, in addition to the traffic shaping engine 304, one or more elements or functions of the transmit queue 302, or other arrangements of circuitry capable of establishing traffic shaping requirements, as will be readily apparent to those skilled in the art.

The scheduler 306 is responsible for scheduling data blocks for transmission from the queues or other transmission elements of the transmit queue 302. In accordance with techniques described in one or more of the above-cited U.S. Patent Applications, the scheduler 306 may utilize one or more of the time slot tables 308 to schedule the data blocks for transmission in a manner that substantially maintains the traffic shaping requirement established by the traffic shaping engine 304 in the presence of collisions between requests from the transmission elements for each of one or more of the time slots.

As shown in the figure, the scheduler 306 receives transmission requests, e.g., in the form of queue schedule or reschedule commands, from the transmit queue 302, and processes these requests in accordance with information stored in the time slot tables 308 to generate block transmission event commands that are returned to the transmit queue 302.

It should be emphasized that the particular information shown in FIG. 3 as being communicated between the elements 300, 302, 304 and 306 thereof is by way of example only, and not intended to limit the scope of the invention in any way. Those skilled in the art will recognize that other messages, commands or information transfer configurations may be used.

The scheduler 306 is an example of an element referred to more generally herein as "scheduling circuitry." In other embodiments, scheduling circuitry may include in addition to the scheduler 306 one or more of the time slot tables 308, one or more elements or functions of the transmit queue 302, or other arrangements of circuitry capable of implementing the scheduling techniques of the present invention. Thus, although shown as separate from the scheduler 306 in the figure, the time slot tables 308 or suitable portions thereof may be incorporated into scheduling circuitry in accordance with the invention. It should again be noted, however, that the use of time slot table scheduling is for purposes of illustration and not limitation, and that the invention can be implemented using non-table scheduling.

The time slot tables 308 may be stored at least in part in the internal memory 104 of the network processor 102, and may also or alternatively be stored at least in part in the external memory 106 of the network processor 102.

A given one of the time slot tables 308 includes a plurality of locations, each corresponding generally to a transmission time slot. More particularly, each location in the table preferably corresponds to a single entry in memory which maps directly to a transmission time slot. Each of the locations is preferably configured for storing an identifier of one of the transmission elements from transmit queue 302 that has requested transmission of a block of data in the corresponding time slot. A time slot may be viewed as the amount of absolute time it takes to transmit a single block of data over interface or other network connection supported by the network processor 102. Each of the tables in the set of tables 308 may be associated with a particular interface or other network connection. It is to be appreciated that the invention does not require any particular size or configuration of data blocks.

The scheduler 306 provides dynamic maintenance of the time slot tables 308, such that identifiers of requesting transmission elements are entered into table locations on a demand basis. That is, as the transmission elements have data blocks to transmit, their identifiers are entered into the appropriate table locations. If a transmission element has no data block to transmit, then its identifier is not entered into the table.

Figure 4:
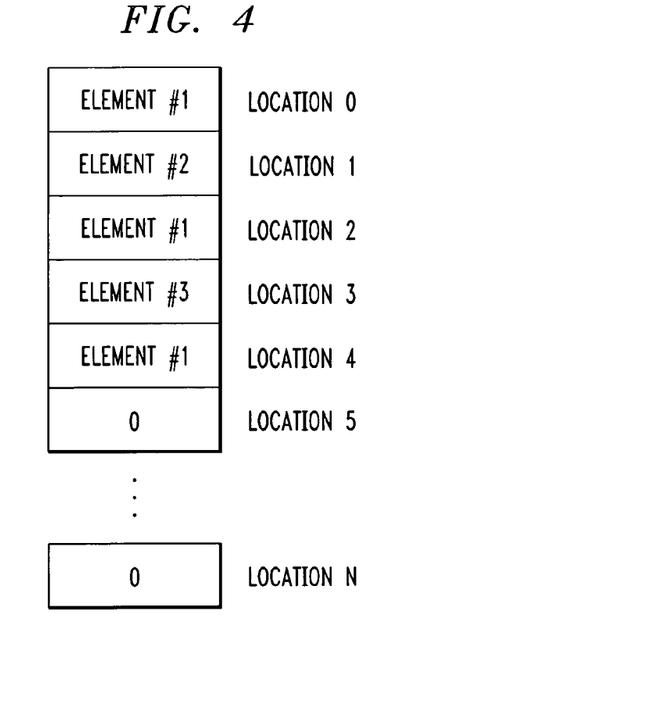
FIG. 4 shows an illustrative time slot table utilizable in a scheduling operation of the FIG. 3 processor in accordance with the invention.

FIG. 4 shows an example of one of the time slot tables 308. The table includes N+1 locations denoted Location 0, Location 1, . . . Location N. Each of the locations is capable of storing an identifier of a transmission element. The state of the table represents the manner in which data blocks will be transmitted out over a particular interface or other network connection supported by the network processor 102. For example, assume that N=5, such that there are a total of six locations in the table, and that these six locations have entries as shown in the figure. An entry of "0" indicates that there is no transmission element identifier stored in the corresponding location. Locations 0, 2 and 4 each have the identifier of an Element #1 stored therein, while locations 1 and 3 have the identifiers of Element #2 and Element #3, respectively, stored therein.

As a result of this example storage of transmission element identifiers, Element #1 will receive exactly one-half of the bandwidth of the network connection with a delay variation of zero, while Element #2 and Element #3 will each receive one-sixth of the bandwidth of the network connection. It can therefore be seen that the manner in which the table is populated with transmission element identifiers will determine the transmission bandwidth assigned to each of the transmission elements. This assignment is made in accordance with one or more traffic shaping requirements established by the traffic shaping engine 304 and communicated to the scheduler 306 via the transmit queue 302.

The assignment of transmission element identifiers to table locations also determines the relative "clumping" or burstiness of the transmission elements, also referred to herein as delay variation. In the FIG. 4 example, each of Element #1, Element #2 and Element #3 will have a delay variation of zero.

In a demand-based scheduling arrangement such as that illustrated in conjunction with FIGS. 3 and 4, there may be collisions between transmission elements that request the same time slot for transmission. As indicated previously, the present invention can utilize the collision handling techniques described in one or more of the above-cited U.S. Patent Applications.

It should be understood that the present invention does not require the particular time slot table configuration shown in FIG. 4, and can use other time slot configurations, including alternative configurations described in one or more of the above-cited U.S. Patent Applications, or non-table scheduling, as will be apparent to those skilled in the art.

The network processor 102 through the use of the above-described time slot table mechanism has the ability to control the transmission rates of individual transmission elements. In accordance with the invention, the network processor 102 is configured such that the programmable service levels can be provided through software-controlled computation of transmission priority in a priority computation element of the processor.

As will be described in greater detail below, the transmission priority is utilized by the network processor 102 in scheduling transmission element requests.

Figure 5:
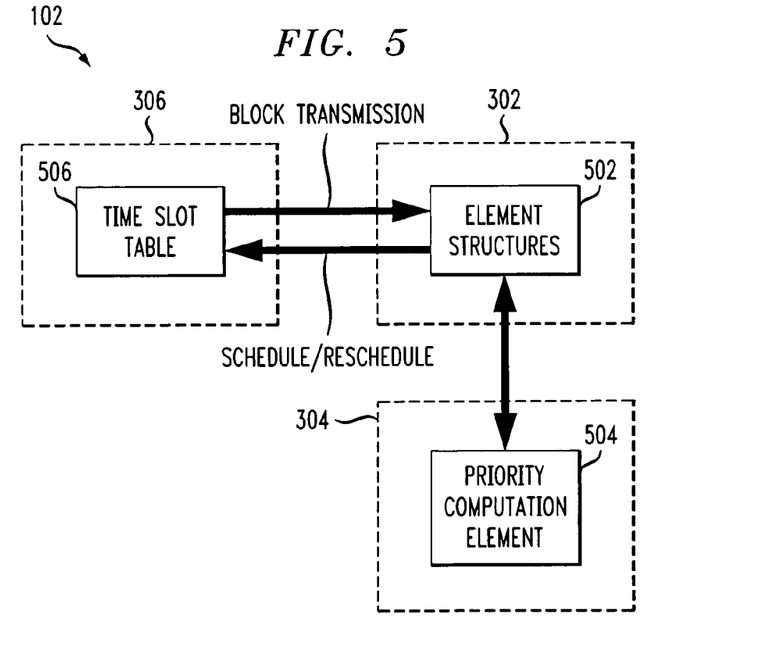
FIG. 5 shows a simplified block diagram of a portion of the FIG. 3 network processor including a priority computation element in accordance with the invention.

FIG. 5 is a diagram of an embodiment of the network processor 102 that will be used to illustrate the software-controlled priority computation aspects of the invention. The network processor 102 in this embodiment includes transmit queue 302, traffic shaping engine 304 and scheduler 306 configured substantially in the manner previously described.

The transmit queue 302 includes a number of element structures 502, which may be transmission queues or other transmission elements for which data blocks are to be scheduled for transmission by the scheduler 306.

The traffic shaping engine 304 includes a priority computation element 504 that interfaces with the traffic queue 302 and provides updated interval information thereto. The operation of the priority computation element 504 and its interaction with other elements of the network processor 102 such as transmit queue 302 and scheduler 306 will be described in greater detail in conjunction with FIGS. 6 through 8.

The scheduler 306 in this embodiment is configured to include at least one time slot table 506, which may correspond to one or more of the time slot tables 308 of FIG. 3. The time slot tables 308 may thus be partially or wholly incorporated into the scheduler 306, as was indicated above.

Also as described previously, the transmit queue 302 supplies time slot requests from the transmission element structures to the scheduler 306 in accordance with a traffic shaping requirement established by the traffic shaping engine 304.

The priority computation element 504 may be implemented, e.g., at least in part as a compute engine or other script processor which operates under software control to provide at least one of transmission priority determination and adjustment in accordance with the invention. As another example, the priority computation element may be implemented as a particular instance or configuration of a specialized processor within the network processor 102, the particular instance or configuration being dedicated to the computation of the transmission priority. As noted previously, the priority computation element may operate in conjunction with an interval computation element such as that described in the above-cited U.S. Patent Applications, and both such elements may be implemented using the same script processor, or separate script processors, within a given network processor.

The priority computation element 504 is associated with the scheduler 306 in this embodiment by virtue of its being coupled thereto via the transmit queue 302. Other associations between the priority computation element 504 and the scheduler 306 may be used in alternative embodiments of the invention, e.g., the priority computation element 504 may be incorporated into the scheduler 306, or coupled thereto using other coupling arrangements.

In operation, the priority computation element 504 determines a transmission priority for one or more constituent transmission elements in a specified group of such transmission elements. The transmission priority is thus adjustable under control of the priority computation element 504, in accordance with one or more scripts or other software programs, so as to facilitate the maintenance of a desired service level for one or more of the transmission elements.

The priority computation element 504 is further operative to determine periodically if the transmission priority requires adjustment in order to maintain the desired service level for one or more of the transmission elements. The priority computation element generally makes a determination as to whether the transmission interval requires adjustment after transmission of a specified number of the data blocks, e.g., after transmission of each of the data blocks, every two data blocks, etc.

In general, the above-noted group of transmission elements may correspond to a first level of an n-level hierarchy of transmission elements, with the constituent transmission elements corresponding to at least one lower level of the n-level hierarchy of transmission elements.

Figure 6:
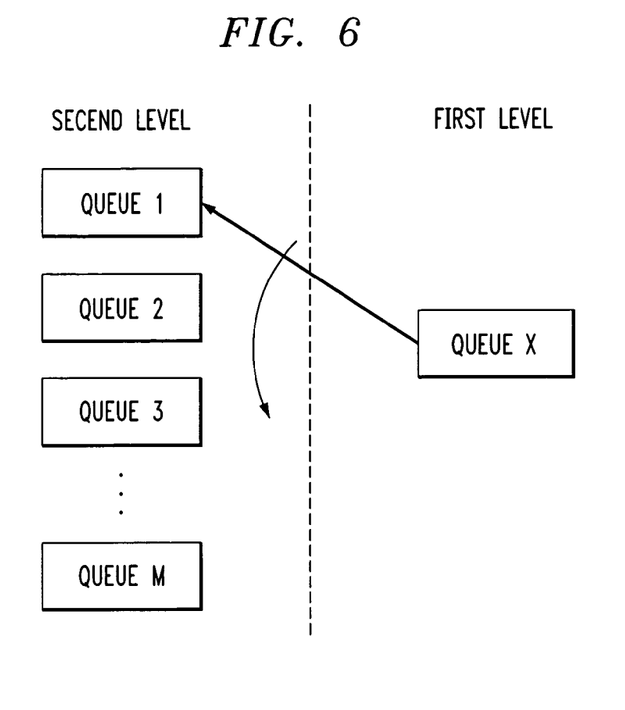
FIG. 6 illustrates a multi-level hierarchy of transmission elements in accordance with the invention.

FIG. 6 shows an example of the n-level hierarchy in which n=2. More particularly, there is a first level in the hierarchy which includes a queue denoted as Queue X. This queue may be viewed as a group of transmission elements which has a number of constituent transmission elements denoted Queue 1, Queue 2, . . . Queue M. These constituent transmission elements are associated with the second level of the two-level hierarchy in FIG. 6. Queue X need not correspond to a physical queue of the processor, but may instead be viewed as a virtual queue which is used to facilitate the scheduling of its constituent transmission elements.

The network processor 102 when using the two-level hierarchy of FIG. 6 schedules the group of constituent transmission elements represented by Queue X at a deterministic or non-deterministic rate as a single entity. The second level allows the bandwidth resulting from the first level of scheduling to be shared among the constituent queues in a programmable manner, as will be described in greater detail below.

In accordance with the invention, the scheduler 306 operates in conjunction with the priority computation element 504 to provide a flexible way to distribute the bandwidth allocated to the group denoted by Queue X among the constituent second level queues. The priority computation element may utilize input information such as constituent queues that have data blocks available for transmission, current high priority queue, queue state, etc. Given such information, a script or other software program directs the priority computation element 504 to determine the particular constituent queue that should have the highest priority. The network processor 102 will then begin servicing the new highest priority queue. In this embodiment, the constituent queues are serviced linearly starting from the highest priority queue. Additionally, the priorities of all other constituent queues adjust linearly up from the selected highest priority queue.

Figure 7A:
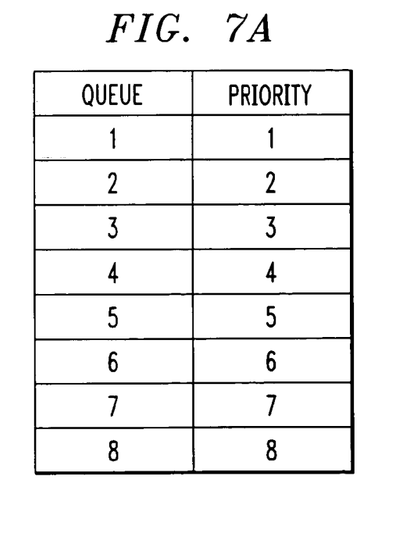
FIGS. 7A and 7B illustrate an alteration of queue priority in accordance with a programmable service level process of the invention.
Figure 7B:
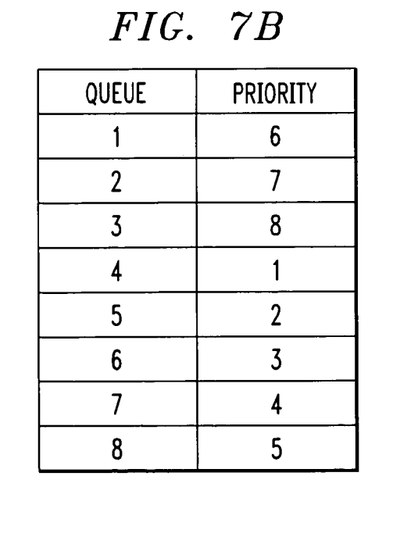

FIGS. 7A and 7B illustrate the alteration of queue priority in accordance with the invention. In this example, there are eight constituent queues denoted Queue 1 through Queue 8, i.e., M=8. FIG. 7A shows the queue priority before an adjustment of queue priority in accordance with the invention. It can be seen that Queue 1 has the highest priority, and the priorities of the remaining constituent queues follow linearly from the highest priority queue, i.e., Queue 2 has the second highest priority, Queue 3 has the third highest priority, and so on. Assume that the priority computation element 504 has subsequently determined that an adjustment in priority is needed, and has determined that the new highest priority constituent queue is Queue 4. FIG. 7B shows the queue priority after adjustment for the new transmission priority. It can be seen that Queue 4 now has the highest priority, and the priorities of the remaining constituent queues follow linearly from the highest priority queue, i.e., Queue 5 has the second highest priority, Queue 6 has the third highest priority, and so on. Queue 3 has the lowest priority among the constituent queues.

Figure 8:
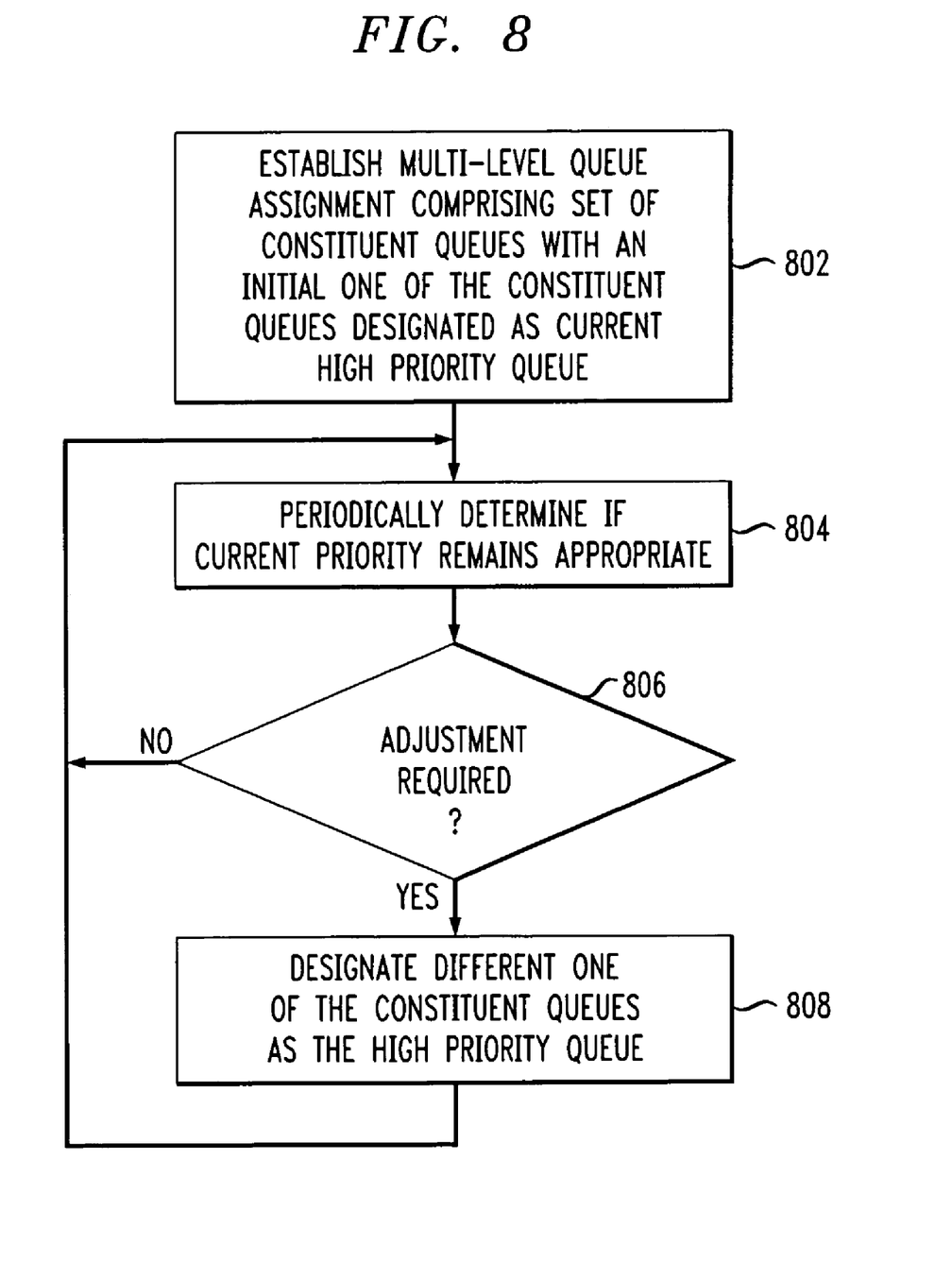
FIG. 8 is a flow diagram illustrating a programmable service level process in accordance with the invention.

FIG. 8 shows a flow diagram of an exemplary software-controlled priority computation process that may be implemented in the network processor 102 in accordance with the present invention. In step 802, a multi-level queue assignment is established, comprising a set of constituent queues with an initial one of the constituent queues designated as a current high priority queue. The priority computation element thus determines an initial transmission priority for the constituent queues of the group by designating a given one of the constituent queues as a current high priority queue. The other constituent queues in the group are arranged in a linear order of decreasing priority relative to the current high priority queue, as was described previously in conjunction with the example of FIG. 7A.

In step 804, the process periodically determines if the current priority remains appropriate. If the current priority is no longer appropriate in providing the desired levels of service for the constituent queues, step 806 will indicate that an adjustment is required, and the process will move to step 808 to designate a different one of the constituent queues as the high priority queue. Otherwise, the process returns to step 804. Again, the remaining constituent queues in the group are arranged in a linear order of decreasing priority relative to the current high priority queue, as in the example of FIG. 7B.

As indicated previously, the network processor 102 utilizes the computed transmission priority to assign requesting transmission elements to locations in the time slot table. It should be noted that in the absence of a software-controlled priority determination, the scheduler 306 can operate as a strict priority scheduler. This is an advantage of the invention, in that the scheduler circuitry can operate without the priority computation, such that this feature need only be utilized when its associated dynamic bandwidth allocation is desired.

The software-controlled priority computation of the present invention can facilitate the implementation of different level of service scheduling algorithms in the network processor, thereby considerably improving the flexibility of the processor relative to conventional processors which are hard-wired to implement particular level of service scheduling algorithms. The programmability in the illustrative embodiment comes from the fact that the network processor can run any level of service scheduling algorithm with software control properly compiled for the structure of the priority computation element 504. The invention can thus be configured such that the control of the bandwidth allocation is provided by software scripts, rather than through hard-wiring of a specific scheduling algorithm.

Another advantage of the software-controlled priority computation in the illustrative embodiment of the invention is that it operates "out of band," i.e., the computation may be performed after the transmission or scheduling for transmission of a given data block, and thus does not delay the transmission of that data block. In contrast, conventional schedulers of the type described previously would generally attempt to implement different levels of service by direct selection of particular data blocks for scheduling, an approach which is generally unsuitable for use in high rate schedulers. With the present invention, the software used to adjust the transmission priority does not need to be involved in the block by block scheduling.

The above-described embodiments of the invention are intended to be illustrative only. For example, although the illustrative embodiment of FIG. 3 utilizes a scheduler which is separate from its associated time slot tables, these tables or portions thereof may be incorporated into scheduling circuitry in accordance with the invention. Similarly, although a separate transmit queue having multiple transmission elements is described in conjunction with the FIG. 3 embodiment, the associated functionality may be distributed across scheduling circuitry and traffic shaping circuitry in accordance with the invention. Other embodiments can use different types and arrangements of processing elements for implementing the described functionality. In addition, the invention can be implemented using more than the two levels of transmission element hierarchy illustrated in FIG. 6. Furthermore, although dynamic table-based scheduling is used in the illustrative embodiments, the present invention can be implemented with static table-based scheduling, or without the use of table-based scheduling. These and numerous other alternative embodiments within the scope of the following claims will be apparent to those skilled in the art.

What is claimed is:

1. A processor comprising:
   scheduling circuitry for scheduling data blocks for transmission from a plurality of transmission elements; and
   a priority computation element associated with the scheduling circuitry and operative to determine a transmission priority for one or more constituent transmission elements in a specified group of such transmission elements, the transmission priority being adjustable so as to facilitate the maintenance of a desired service level for one or more of the transmission elements;
   wherein the priority computation element determines a transmission priority for the constituent transmission elements of the group by designating one or more of the constituent transmission elements as current high priority transmission elements, with the other constituent transmission elements in the group being arranged in order of decreasing priority relative to the one or more current high priority transmission elements.

2. The processor of claim 1 wherein the priority computation element operates under software control in at least one of determining and adjusting the transmission priority for the one or more constituent transmission elements.

3. The processor of claim 1 wherein the priority computation element comprises a script processor.

4. The processor of claim 1 wherein the group of transmission elements corresponds to a first level of an n-level hierarchy of transmission elements, the constituent transmission elements corresponding to at least one lower level of the n-level hierarchy of transmission elements.

5. The processor of claim 1 wherein each of the transmission elements comprises a queue.

6. A processor comprising:
scheduling circuitry for scheduling data blocks for transmission from a plurality of transmission elements; and
a priority computation element associated with the scheduling circuitry and operative to determine a transmission priority for one or more constituent transmission elements in a specified group of such transmission elements, the transmission priority being adjustable so as to facilitate the maintenance of a desired service level for one or more of the transmission elements;
wherein the priority computation element determines an initial transmission priority for the constituent transmission elements of the group by designating a given one of the constituent transmission elements as a current high priority transmission element, with the other constituent transmission elements in the group being arranged in a linear order of decreasing priority relative to the current high priority transmission element.

7. The processor of claim 6 wherein the priority computation element subsequently adjusts the transmission priority for the constituent transmission elements of the group by designating another of the constituent transmission elements as the current high priority transmission element, with the remaining constituent transmission elements in the group being arranged in a liner order of decreasing priority relative to the current high priority transmission element.

8. The processor of claim 1 wherein the scheduling circuitry is configurable for utilization of at least one time slot table in scheduling the data blocks for transmission.

9. The processor of claim 1 wherein the priority computation element is operative to determine periodically if the transmission priority requires adjustment in order to maintain the desired service level for one or more of the transmission elements.

10. The processor of claim 9 wherein the priority computation element makes a determination as to whether the transmission priority requires adjustment, after transmission of a specified number of the data blocks.

11. The processor of claim 9 wherein the priority computation element makes the determination as to whether the transmission priority requires adjustment after transmission of each of the data blocks.

12. The processor of claim 1 further comprising traffic shaping circuitry coupled to the scheduling circuitry, the traffic shaping circuitry comprising the priority computation element.

13. The processor of claim 12 further comprising transmit queue circuitry coupled to the scheduling circuitry, wherein the transmission elements comprise one or more queues associated with the transmit queue circuitry, the transmit queue circuitry supplying time slot requests from the transmission elements to the scheduling circuitry in accordance with a traffic shaping requirement established by the traffic shaping circuitry.

14. The processor of claim 1 wherein one or more of the data blocks comprise data packets.

15. The processor of claim 1 wherein at least a subset of the constituent transmission elements have identifiers configured such that a given one of the transmission element identifiers can be linked to another of the transmission element identifiers so as to form a linked list of the corresponding transmission elements.

16. The processor of claim 1 wherein the processor comprises a network processor configured to provide an interface for data block transfer between a network and a switch fabric.

17. The processor of claim 1 wherein the processor is configured as an integrated circuit.

18. A method for use in a processor, the method comprising:
scheduling data blocks for transmission from a plurality of transmission elements;
wherein the scheduling step schedules the data blocks for transmission in accordance with a transmission priority determined for one or more constituent transmission elements in a specified group of such transmission elements, the transmission priority being adjustable so as to facilitate the maintenance of a desired service level for one or more of the transmission elements; and
wherein a transmission priority is determined for the constituent transmission elements of the group by designating one or more of the constituent transmission elements as current high priority transmission elements, with the other constituent transmission elements in the group being arranged in order of decreasing priority relative to the one or more current high priority transmission elements.

19. An article of manufacture comprising a computer-readable storage medium for use in conjunction with a processor, the medium storing one or more software programs for use in scheduling data blocks for transmission from a plurality of transmission elements, the one or more programs when executed providing at least one of determination of a priority for one or more constituent transmission elements in a specified group of such elements and adjustment of the transmission priority so as to facilitate the maintenance of a desired service level for one or more of the transmission elements, wherein a transmission priority is determined for the constituent transmission elements of the group by designating one or more of the constituent transmission elements as current high priority transmission elements, with the other constituent transmission elements in the group being arranged in order of decreasing priority relative to the one or more current high priority transmission elements.

20. The method of claim 18 further comprising the step of determining an initial transmission priority for the constituent transmission elements of the group by designating a given one of the constituent transmission elements as a current high priority transmission element, with the other constituent transmission elements in the group being arranged in a linear order of decreasing priority relative to the current high priority transmission element.

* * * * *